United States Patent
Taniguchi

(10) Patent No.: US 11,290,474 B2
(45) Date of Patent: Mar. 29, 2022

(54) CYBER ATTACK EVALUATION METHOD AND CYBER ATTACK EVALUATION DEVICE

(71) Applicant: FUJITSU LIMITED, Kawasaki (JP)

(72) Inventor: Tsuyoshi Taniguchi, Katsushika (JP)

(73) Assignee: FUJITSU LIMITED, Kawasaki (JP)

( * ) Notice: Subject to any disclaimer, the term of this patent is extended or adjusted under 35 U.S.C. 154(b) by 263 days.

(21) Appl. No.: 16/656,719

(22) Filed: Oct. 18, 2019

(65) Prior Publication Data

US 2020/0137095 A1    Apr. 30, 2020

(30) Foreign Application Priority Data

Oct. 31, 2018  (JP) .............................. JP2018-205343

(51) Int. Cl.
   *H04L 29/06*  (2006.01)
(52) U.S. Cl.
   CPC ................. *H04L 63/1425* (2013.01)
(58) Field of Classification Search
   CPC .......... H04L 63/1425; H04L 61/1511; H04L 63/1416; G06F 21/552; G06F 21/566
   See application file for complete search history.

(56) References Cited

U.S. PATENT DOCUMENTS

| | | | |
|---|---|---|---|
| 2015/0213131 A1* | 7/2015 | Styler .................. | G06Q 10/107 707/767 |
| 2018/0176242 A1 | 6/2018 | Shibahara et al. | |
| 2018/0191736 A1 | 7/2018 | Cho et al. | |

(Continued)

FOREIGN PATENT DOCUMENTS

| | | |
|---|---|---|
| EP | 3570504 A1 | 11/2019 |
| WO | 2016/194909 A1 | 12/2016 |
| WO | 2018/163464 A1 | 9/2018 |

OTHER PUBLICATIONS

Lison, Neural Reputation Models learned from Passive DNS Data, 2017 IEEE International Conference on Big Data (Bigdata), pp. 3662-3671 (Year: 2017).*

(Continued)

*Primary Examiner* — Chris Parry
*Assistant Examiner* — Weiwei Y Stiltner
(74) *Attorney, Agent, or Firm* — Fujitsu Patent Center

(57) ABSTRACT

A cyber attack evaluation method includes transmitting, based on first domain information included in cyber attack information, an inquiry about whether a first IP address associated with the first domain information is stored to a first management server configured to store associations between domain information and IP addresses, transmitting another inquiry about a first answer history related to the first domain information to a second management server configured to store answer histories of the first management server by monitoring communication of the first management server, the answer histories being related to the associations between the domain information and the IP addresses, and outputting, based on an answer of the inquiry acquired from the first management server and the first answer history acquired from the second management server, a result of diagnosing threat content of a cyber attack related to the first domain information.

5 Claims, 15 Drawing Sheets

| DOMAIN | NUMBER OF A RECORDS | DISPOSAL RATIO | USAGE PERIOD |
|---|---|---|---|
| xxx.xxxx.com | 1000 | 95% | SHORT TIME PERIOD |
| yyy.yyyy.org | 1 | 0% | LONG TIME PERIOD |
| ... | ... | ... | ... |

(56) References Cited

U.S. PATENT DOCUMENTS

2018/0309772 A1    10/2018  Song et al.
2020/0134175 A1*   4/2020   Marwah ................ G06F 21/552

OTHER PUBLICATIONS

Daiki Chiba et al., "DomainProfiler: Discovering Domain Names Abused in Future", 2016 46th Annual IEEE/IFIP International Conference on Dependable Systems and Networks(DSN), IEEE, pp. 491-502, Jun. 28, 2016, XP032973585. [Cited in EESR filed herewith].

EESR—Extended European Search Report of European Patent Application No. 19203788.5 dated Jan. 8, 2020.

\* cited by examiner

FIG. 3

```
[XXXX@localhost ~]$ dig www.XXXXXX.co.jp

; <<>> Dig 9.9.4-RedHat-9.9.4-18.el7 <<>> www.XXXXXX.co.jp
;; global options: +cmd
;; Got answer:
;; ->>HEADER<<- opcode: QUERY, status: NOERROR, id: 60115
;; flags: qr rd ra; QUERY: 1, ANSWER: 1, AUTHORITY: 0, ADDITIONAL: 1

;; OPT PSEUDOSECTION:
; EDNS: version: 0, flags:; udp: 4096
;; QUESTION SECTION:
;www.XXXXXX.co.jp.          IN    A ;; ANSWER SECTION:
www.XXXXXX.co.jp.    49    IN    A    XXX.XXX.XXX.XXX ;; Query time: 9 msec
;; SERVER: YYY.YYY.Y.Y#53(YYY.YYY.Y.Y)
;; WHEN: MONTH XXX. XX 23:XX:XX JST 2017
;; MSG SIZE  rcvd: 61

[XXXX@localhost ~]$ ▮
```

FIG. 5

| DOMAIN | A RECORD | first seen | last seen |
|---|---|---|---|
| xxx.xxxx.com | aaa.aaa.aaa.aaa | 2018/8/1 00:00:00 | 2018/8/7 00:00:00 |
| ... | ... | ... | ... |
| yyy.yyyy.org | bbb.bbb.bbb.bbb | 2015/3/31 12:34:56 | 2016/7/1 00:00:00 |
| ... | ... | ... | ... |

FIG. 8

| DOMAIN | A RECORD | EXISTENCE PERIOD |
|---|---|---|
| xxx.xxxx.com | aaa.aaa.aaa.aaa | 6 (DAYS) |
| ... | ... | ... |
| yyy.yyyy.org | bbb.bbb.bbb.bbb | 457 (DAYS) |
| ... | ... | ... |

FIG. 10

| DOMAIN | NUMBER OF A RECORDS | DISPOSAL RATIO | USAGE PERIOD |
|---|---|---|---|
| xxx.xxxx.com | 1000 | 95% | SHORT TIME PERIOD |
| yyy.yyyy.org | 1 | 0% | LONG TIME PERIOD |
| ... | ... | ... | ... |

FIG. 12

| DOMAIN | OLDEST A RECORD | first seen | last seen | FRESHNESS |
|---|---|---|---|---|
| xxx.xxxx.com | aaa.aaa.aaa.aaa | 2018/1/1 00:00:00 | 2018/8/7 00:00:00 | FRESH |
| vv.vvv.org | zzz.zzz.zzz.zzz | 2009/1/1 11:11:11 | 2009/1/11 00:00:00 | NO EVALUATION |
| ... | ... | ... | ... | ... |

FIG. 14

| DIAGNOSTIC TARGET | xxx.xxx.com |
|---|---|
| ACTIVITY STATUS | aaa.aaa.aaa.aaa |
| EXISTENCE PERIOD | 6 DAYS |
| USAGE PERIOD | SHORT TIME PERIOD |
| FRESHNESS | FRESH |
| REMARK | NEW ACTIVITY, SHORT-TERM ACTIVITY |

CYBER ATTACK EVALUATION METHOD AND CYBER ATTACK EVALUATION DEVICE

CROSS-REFERENCE TO RELATED APPLICATION

This application is based upon and claims the benefit of priority of the prior Japanese Patent Application No. 2018-205343, filed on Oct. 31, 2018, the entire contents of which are incorporated herein by reference.

FIELD

The embodiments relate to a cyber attack evaluation technique.

BACKGROUND

In recent years, cyber attacks such as invalid access made via networks are severe problems. To handle such cyber attacks, it is important to analyze a large amount of cyber attack information monitored daily and detect malicious communication from an attack source.

One of existing methods of detecting malicious communication uses a black list of malicious domains. The black list may be received in the Portable Document Format (PDF) format or the like even when the black list is in a text format or the comma-separated values (CSV) format or is a document.

Discussion is internationally underway to establish standardization for sharing Cyber Threat Intelligence, which is a report on profile information of attackers. Formats including Structured Threat Information eXpression (STIX) exist. STIX is composed of 8 information groups, cyber threats (Campaigns), threat actors (Threat_Actors), tactics, techniques, and procedures (TTPs), indicators (Indicators), observables (Observables), incidents (Incidents), courses of action (Course_Of_Action), and exploit targets (Exploit_Targets). In STIX version 1.1.1, the black list is described in the eXtensible Markup Language (XML) format.

Indicators such as the black list or Cyber Treat Intelligence include information of malicious domains, Internet Protocol (IP) addresses, and Uniform Resource Locators (URLs). A method for identifying a malicious website using attacker information of the malicious domains, IP addresses, URLs, and the like included in the indicators to detect malicious communication is known as an existing technique. For example, a related technique is disclosed in International Publication Pamphlet No. WO2016/194909.

SUMMARY

According to an aspect of the embodiments, a cyber attack evaluation method includes transmitting, based on first domain information included in cyber attack information, an inquiry about whether a first IP address associated with the first domain information is stored to a first management server configured to store associations between domain information and IP addresses, transmitting another inquiry about a first answer history related to the first domain information to a second management server configured to store answer histories of the first management server by monitoring communication of the first management server, the answer histories being related to the associations between the domain information and the IP addresses, and outputting, based on an answer of the inquiry acquired from the first management server and the first answer history acquired from the second management server, a result of diagnosing threat content of a cyber attack related to the first domain information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram describing an example of a query based on a dig command;

FIG. 5 is a diagram describing an example of a DNS history list;

FIG. 8 is a diagram describing an example of existence period learning data;

FIG. 10 is a diagram describing an example of usage period estimation data;

FIG. 12 is a diagram describing an example of freshness evaluation data;

FIG. 14 is a diagram describing an example of a diagnosis result; and

DESCRIPTION OF EMBODIMENTS

The indicators such as the black list or Cyber Threat Intelligence are useful and static at the time when the indicators are made public, and it is difficult to evaluate whether the indicators are useful at the time when the indicators are used. For example, an attacker that has made a cyber attack may change or erase, within a short time period, an IP address, a domain, malware, and the like, which are attack infrastructure, in order to avoid tracking by an analyzer. Even when the attacker stops the operation of the malicious domain, the stop of the operation is not reflected in the indicators made public, and an operation relies on periodical updates of the indicators. In the conventional technology, it is difficult to evaluate the indicators related to cyber attacks.

Hereinafter, a cyber attack evaluation program, a cyber attack evaluation method, and a cyber attack evaluation device according to an embodiment are described with reference to the drawings. In the embodiment, configurations having the same function are indicated by the same symbol, and a duplicated description is omitted. The cyber attack evaluation program, the cyber attack evaluation method, and the cyber attack evaluation device, which are described in the following embodiment, are merely an example and are not intended to limit the embodiments. The following embodiments may be appropriately combined without contradiction.

Figure 1:
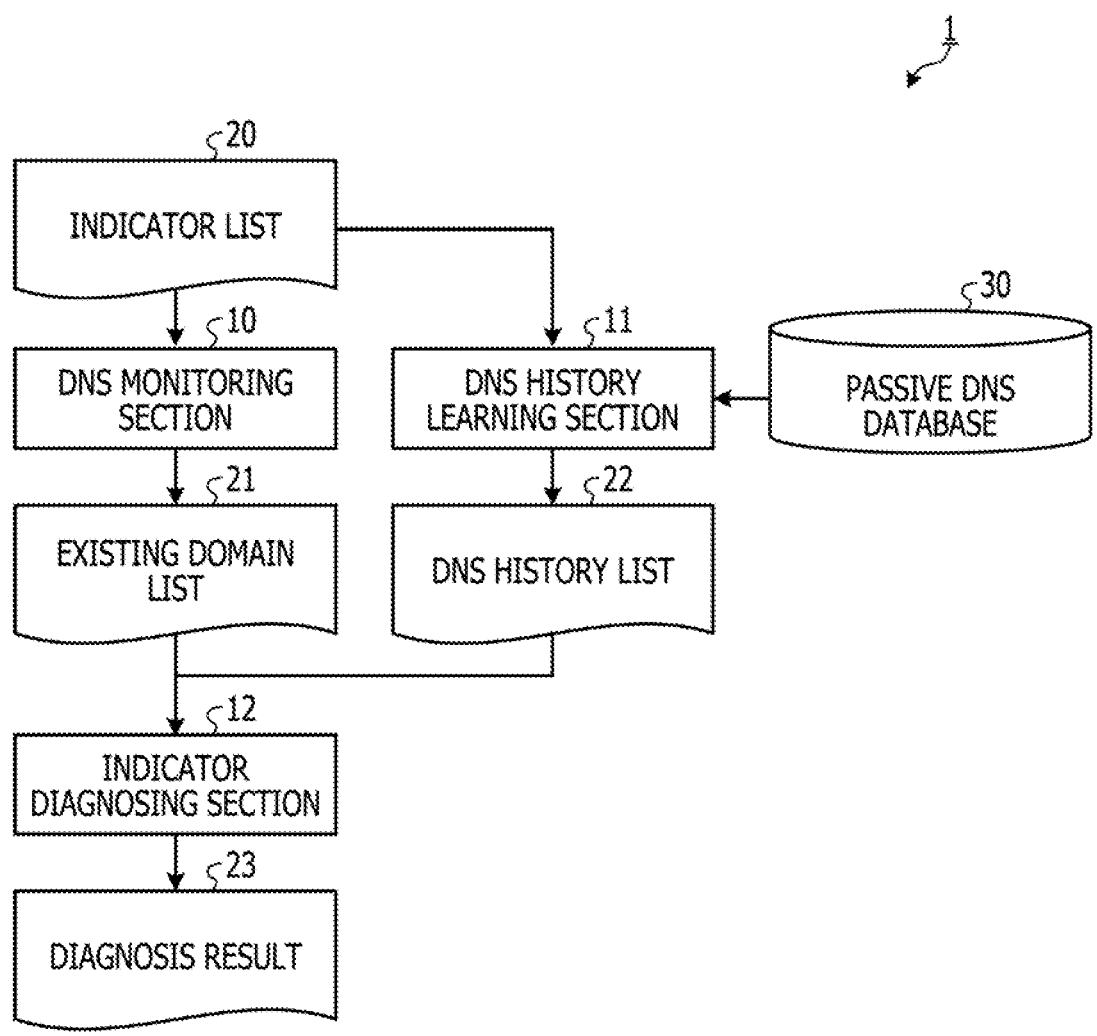
FIG. 1 is a block diagram illustrating an example of a functional configuration of an information processing device according to an embodiment.

FIG. 1 is a block diagram illustrating an example of a functional configuration of an information processing device according to the embodiment. An information processing device 1 according to the embodiment is, for example, a computer such as a personal computer (PC). The information processing device 1 is an example of a cyber attack evaluation device.

As illustrated in FIG. 1, the information processing device 1 receives an input indicator list 20 of indicators to be used to detect malicious communication. The indicator list 20 is a so-called black list generated by extracting information from Cyber Treat Intelligence and includes, as indicators, domain information (for example, domain names related to malicious domains such as "xxx.xxx.com" and "yyy.yyyy.org") on malicious domains related to attack sources. The indicators of the indicator list 20 are an example of cyber attack information.

For example, the indicator list 20 is a list obtained by extracting malicious domains from a black list of malicious domains made public or is a list obtained by causing a purser or the like to process indicators described in Cyber Treat Intelligence that is profile information of specific attacks (campaigns and malware).

The information processing device 1 outputs a diagnosis result 23 of diagnosing threat content of a cyber attack related to the domain information indicated in the input indicator list 20. Based on the diagnosis result 23, a user may evaluate whether a malicious domain included in the indicator list 20 is currently useful to detect malicious communication.

The information processing device 1 includes a DNS monitoring section 10, a DNS history learning section 11, and an indicator diagnosing section 12.

The DNS monitoring section 10 is a processing section that executes, based on the domain information of the input indicator list 20, a monitoring process of providing an inquiry about whether an IP address associated with the domain information exists to a domain name system (DNS) server, which manages associations between domain information and IP addresses. The DNS server is an example of a first managing server that manages associations between domain information and IP addresses.

It is sufficient if the DNS monitoring section 10 outputs a query to Active DNS and collects information on the association between the domain information and the IP address. A managing server that is a destination to which the inquiry is provided is not limited to the DNS server. Active DNS is known, as described in "Kountouras, Athanasios, et al. "Enabling network security through active DNS datasets." International Symposium on Research in Attacks, Intrusions, and Defenses. Springer, Cham, 2016." and the like.

In Active DNS, a domain "seed" to be used to output a query is prepared. The "seed" may be obtained by referencing a zone file of an authoritative DNS server, web crawling, a top list of Alexa, a black list made public, or the like. When seeds are prepared in a comprehensive manner, DNS information wider than that obtained based on Passive DNS (described later in detail) may be collected, but there is a trade-off with the cost for the collection of the seeds.

The DNS monitoring section 10 outputs, as an existing domain list 21, domain information currently associated with the IP address or existing domain information as a result of the inquiry.

Figure 2:
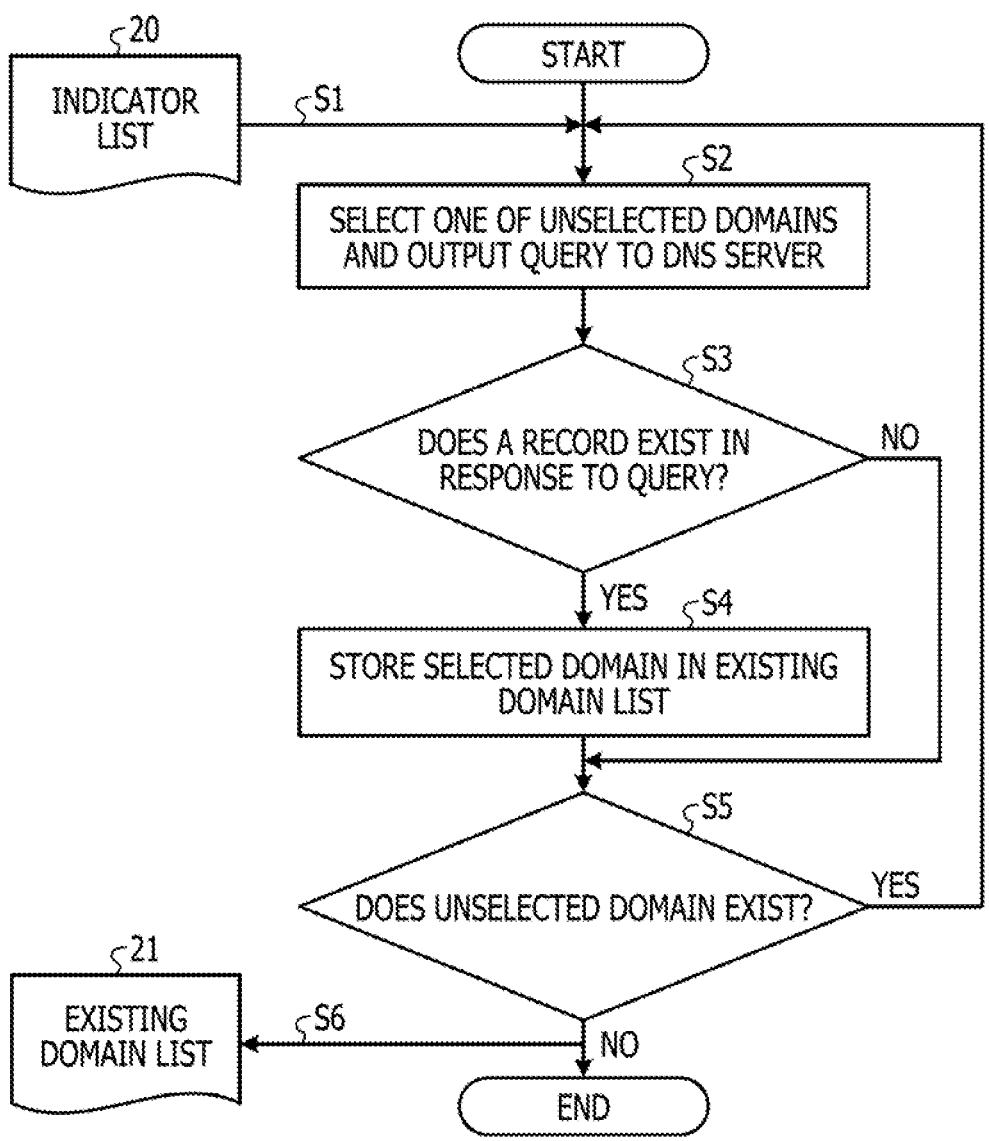
FIG. 2 is a flowchart illustrating an example of a monitoring process.

FIG. 2 is a flowchart illustrating an example of the monitoring process. As illustrated in FIG. 2, when the process is started, the DNS monitoring section 10 receives the input indicator list 20 (in S1).

Next, the DNS monitoring section 10 selects one of unselected domains of the indicator list 20 and outputs a query about the selected domain to the DNS server (in S2).

FIG. 3 is a diagram describing an example of a query based on a dig command. As illustrated in FIG. 3, when an operating system (OS) such as Linux (registered trademark)-based OS is used, the query is output to the DNS server based on the dig command. In the example illustrated in FIG. 3, the query is output to the DNS server based on the dig command in order to inquire about a value of an IP address of "www.XXXXXX.co.jp". A response to the inquiry is returned and indicates that an A record (IP address) of "www.XXXXXX.co.jp" is "XXX.XXX.XXX.XXX" that is after "IN A" in a row next to a row of ";; ANSWER SECTION:". The dig command has various options, which will not be described.

Return to FIG. 2, after S2, the DNS monitoring section 10 determines whether an A record (IP address) exists in a response to the query (in S3). When the A record exists (Yes in S3), the DNS monitoring section 10 causes the selected domain to be stored in the existing domain list 21 (in S4). When the A record does not exist (No in S3), this means that the A record for the selected domain is not registered in the DNS, and the DNS monitoring section 10 does not execute the process of S4 and causes the process to proceed to S5.

Next, the DNS monitoring section 10 determines whether an unselected domain exists in the indicator list 20 (in S5). When the unselected domain exists (Yes in S5), the DNS monitoring section 10 causes the process to return to S2 to continuously execute the processes of S2 to S5 until an unselected domain does not exist.

When the unselected domain does not exist (No in S5), the DNS monitoring section 10 outputs the existing domain list 21 of domains with A records among domains included in the indicator list 20 (in S6) and terminates the process.

Return to FIG. 1, the DNS history learning section 11 is a processing section that executes, based on the domain information of the input indicator list 20, a history learning process of providing an inquiry to a Passive DNS database 30 managed by a Passive DNS server. The DNS history learning section 11 outputs, as a DNS history list 22, a result of the inquiry about the domain information of the indicator list 20.

A basic concept of Passive DNS is that a DNS packet returned by the authoritative DNS server is captured and a resource record is extracted from the DNS packet without zone file transfer. For example, the Passive DNS server monitors communication of the DNS server and manages, as the Passive DNS database 30, answer histories, related to the associations between the domain information and the IP addresses, of the DNS server. The Passive DNS server is an example of a second managing server. The DNS history learning section 11 and the DNS monitoring section 10 are an example of a domain information processing section.

Passive DNS may significantly reduce a load to be applied due to the zone file transfer. An advantage of Passive DNS is that, in the case where time information on the response to the query and the resource record are stored, when an emergency such as an incident occurs, the state of utilized attack infrastructure on the DNS may be reproduced. Passive DNS is known, as described in a document such as "Weimer, Florian. "Passive DNS replication." FIRST conference on computer security incident. 2005." and the like.

Figure 4:
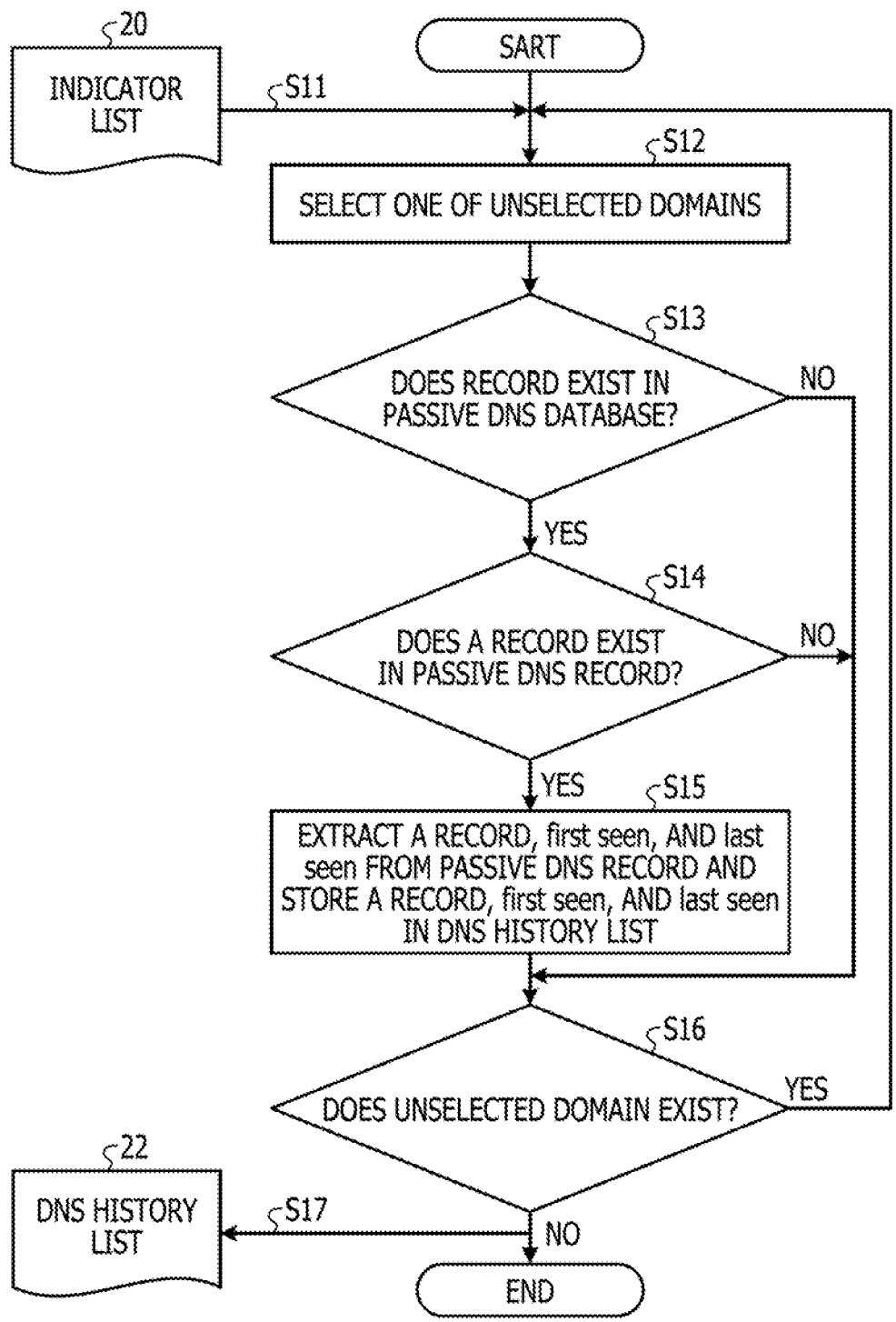
FIG. 4 is a flowchart illustrating an example of a history learning process.

FIG. 4 is a flowchart illustrating an example of the history learning process. As illustrated in FIG. 4, when the process is started, the DNS history learning section 11 receives the input indicator list 20 (in S11).

Next, the DNS history learning section 11 selects one of unselected domains of the indicator list 20 (in S12). Then, the DNS history learning section 11 provides an inquiry to the Passive DNS server and determines whether a record related to the selected domain exists in the Passive DNS database 30 (in S13).

For example, although a format of Passive DNS varies depending on a service providing source, an A record for a certain domain and a history of a query to the A record are registered as a record in the Passive DNS database 30. For example, an answer history to a time and date (first seen) when the query to the A record has been observed first and a time and date (last seen) when the query to the A record has been observed last is registered together with the A record in the Passive DNS database 30.

When the record related to the selected domain exists (Yes in S13), the DNS history learning section 11 determines whether data of the A record (IP address) related to the selected domain exists (in S14). Not only the A record (IP address) but also an NS record, an SOA record, and the like may be stored in a record of Passive DNS. Thus, whether data on the A record exists is confirmed.

When the A record exists (Yes in S14), the DNS history learning section 11 extracts the A record, first seen, and last seen from the record of Passive DNS and causes the extracted A record, the extracted first seen, and the extracted last seen to be stored in the DNS history list 22 (in S15).

FIG. 5 is a diagram describing an example of the DNS history list 22. As illustrated in FIG. 5, the DNS history list 22 stores, for a "domain" of the indicator list 20, an "A record", "first seen", and "last seen" that have been obtained from results of an inquiry to the Passive DNS server. For example, in the "A record", an A record (for example, an IP address "aaa.aaa.aaa.aaa" for "xxx.xxxx.com", or the like) referenced from Passive DNS is stored for the "domain". In addition, in the "first seen" and the "last seen", data of first seen and last seen for the referenced A records is stored.

Return to FIG. 4, when the record related to the selected domain does not exist (No in S13) or when the record exists but the A record does not exist (No in S14), the DNS history learning section 11 does not execute the process of S15 and causes the process to proceed to S16. For example, since a DNS packet able to be captured varies depending on an authoritative DNS server close to a region where a sensor is installed, the record related to the selected domain may not exist. In the case where only the SOA record and the like are stored, even when the domain exists, the A record may not exist.

Then, the DNS history learning section 11 determines whether an unselected domain exists in the indicator list 20 (in S16). When the unselected domain exists (Yes in S16), the DNS history learning section 11 causes the process to return to S12 and continuously executes the processes of S12 to S16 until an unselected domain does not exist. When the unselected domain does not exist (No in S16), the DNS history learning section 11 outputs the DNS history list 22 (in S17) and terminates the process.

Return to FIG. 1, the indicator diagnosing section 12 is a processing section that executes, based on the existing domain list 21 acquired from the DNS and the DNS history list 22 acquired from Passive DNS, a diagnosis process of outputting the diagnosis result 23 of diagnosing the threat content of the cyber attack related to the domain information of the indicator list 20. The indicator diagnosing section 12 is an example of a diagnosing section.

Figure 6:
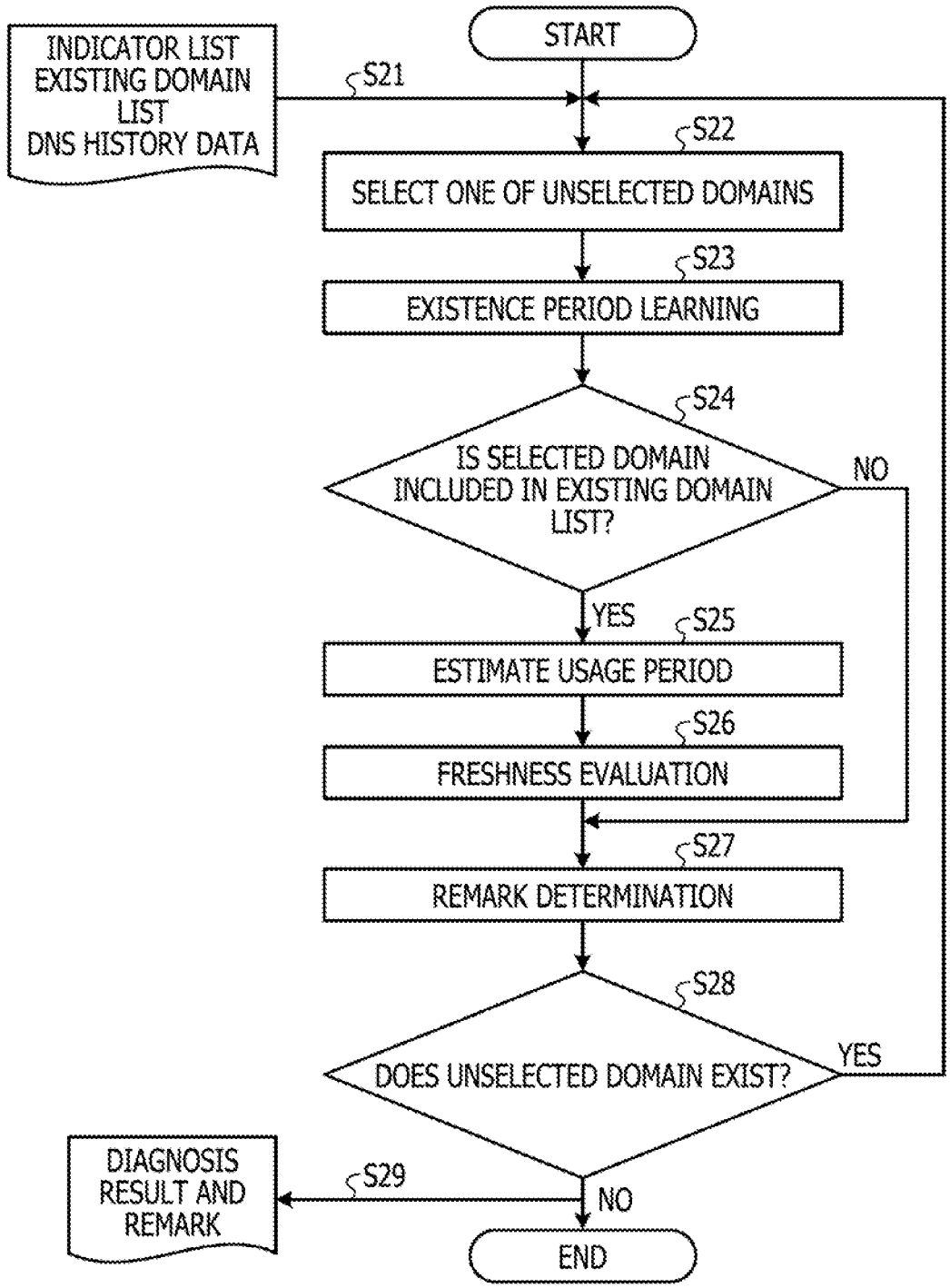
FIG. 6 is a flowchart illustrating an example of a diagnosis process.

FIG. 6 is a flowchart illustrating an example of the diagnosis process. As illustrated in FIG. 6, when the process is started, the indicator diagnosing section 12 receives the input indicator list 20, the input existing domain list 21, and input history data of the DNS history list 22 (in S21).

Next, the indicator diagnosing section 12 selects one of unselected domains of the indicator list 20 (in S22). Then, the indicator diagnosing section 12 executes existence period learning on the selected domain (in S23). The existence period learning is a process of learning an existence period in Passive DNS for the selected domain. For example, the existence period is evaluated as a time period for which a DNS packet has been observed or as the number of dates elapsed from first seen to last seen, based on history data, related to the selected domain, of the DNS history list 22. When the accuracy is emphasized, the existence period may be evaluated in seconds.

Figure 7:
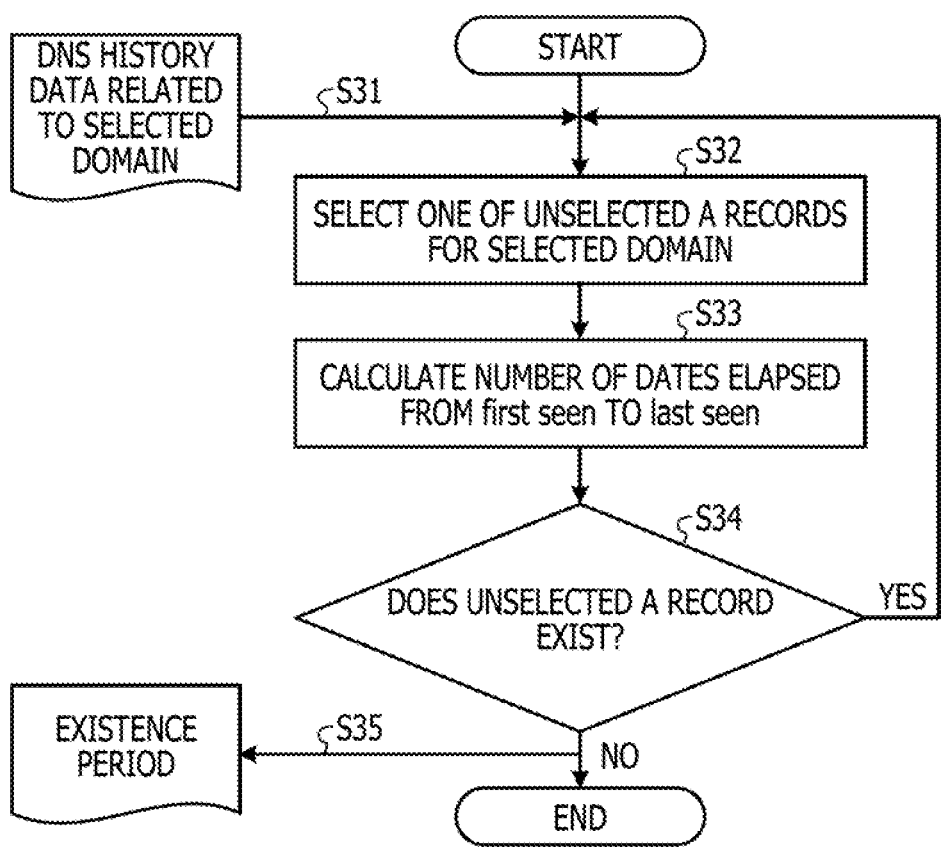
FIG. 7 is a flowchart illustrating an example of an existence period learning process.

FIG. 7 is a flowchart illustrating an example of the existence period learning process. As illustrated in FIG. 7, when the existence period learning (of S23) is started, the indicator diagnosing section 12 references the history data, related to the selected domain, of the DNS history list 22 (in S31).

Then, the indicator diagnosing section 12 selects, for the selected domain, one of unselected A records registered in Passive DNS (in S32). Then, the indicator diagnosing section 12 calculates the number of dates elapsed from first seen and last seen for the selected A record (in S33). The indicator diagnosing section 12 causes the calculated result to be stored as existence period learning data in a memory.

FIG. 8 is a diagram describing an example of the existence period learning data. As illustrated in FIG. 8, existence period learning data 24 includes, for a "domain", an "A record" registered in Passive DNS and an "existence period" that is the calculated number of elapsed dates. For example, in FIG. 5, since first seen of the A record "aaa.aaa.aaa.aaa" for the domain "xxx.xxxx.com" indicates 0 o'clock 0 minutes 0 seconds, Aug. 1, 2018, and last seen of the A record "aaa.aaa.aaa.aaa" for the domain "xxx.xxxx.com" indicates 0 o'clock 0 minutes 0 seconds, Aug. 7, 2018, the "existence period" is calculated as 6 days. Thus, in the example illustrated in FIG. 8, for "xxx.xxxx.com" indicated in the "domain", "aaa.aaa.aaa.aaa" is stored in the "A record" and "6 (days)" is stored in the "existence period". When the elapsed period is shorter than 1 day, the existence period may be rounded down and evaluated.

Then, the indicator diagnosing section 12 determines whether an unselected A record exists among A records registered in Passive DNS (in S34). When the unselected A record exists (Yes in S34), the indicator diagnosing section 12 causes the process to return to S32 and continuously executes the processes of S32 to S34 until an unselected A record does not exist. When the unselected A record does not exist (No in S34), the indicator diagnosing section 12 outputs the learned existence period or the existence period learning data 24 (in S35) and terminates the process.

Return to FIG. 6, after S23, the indicator diagnosing section 12 determines whether the domain selected in S22 is included in the existing domain list 21 (in S24). When the domain selected in S22 is included in the existing domain list 21 (Yes in S24), the indicator diagnosing section 12 executes usage period estimation on the existing domain (in S25) and executes freshness evaluation (in S26). When the domain selected in S22 is not included in the existing domain list 21 (No in S24), the indicator diagnosing section 12 does not execute the processes of S25 and S26 and causes the process to proceed to S27.

In the usage period estimation (of S25), the indicator diagnosing section 12 estimates, based on the existence period (existence period learning data 24) learned in S23, a future time period for which the A record will be continuously registered and be used. In the freshness evaluation (of S26), freshness indicated by the first seen of the A record for the domain is evaluated. This freshness is a value indicating a validity degree that indicates whether the domain is still valid as an indicator. For example, as the first seen is closer to the current time, the freshness is better. It is apparent that the domain is still valid as the indicator.

Figure 9:
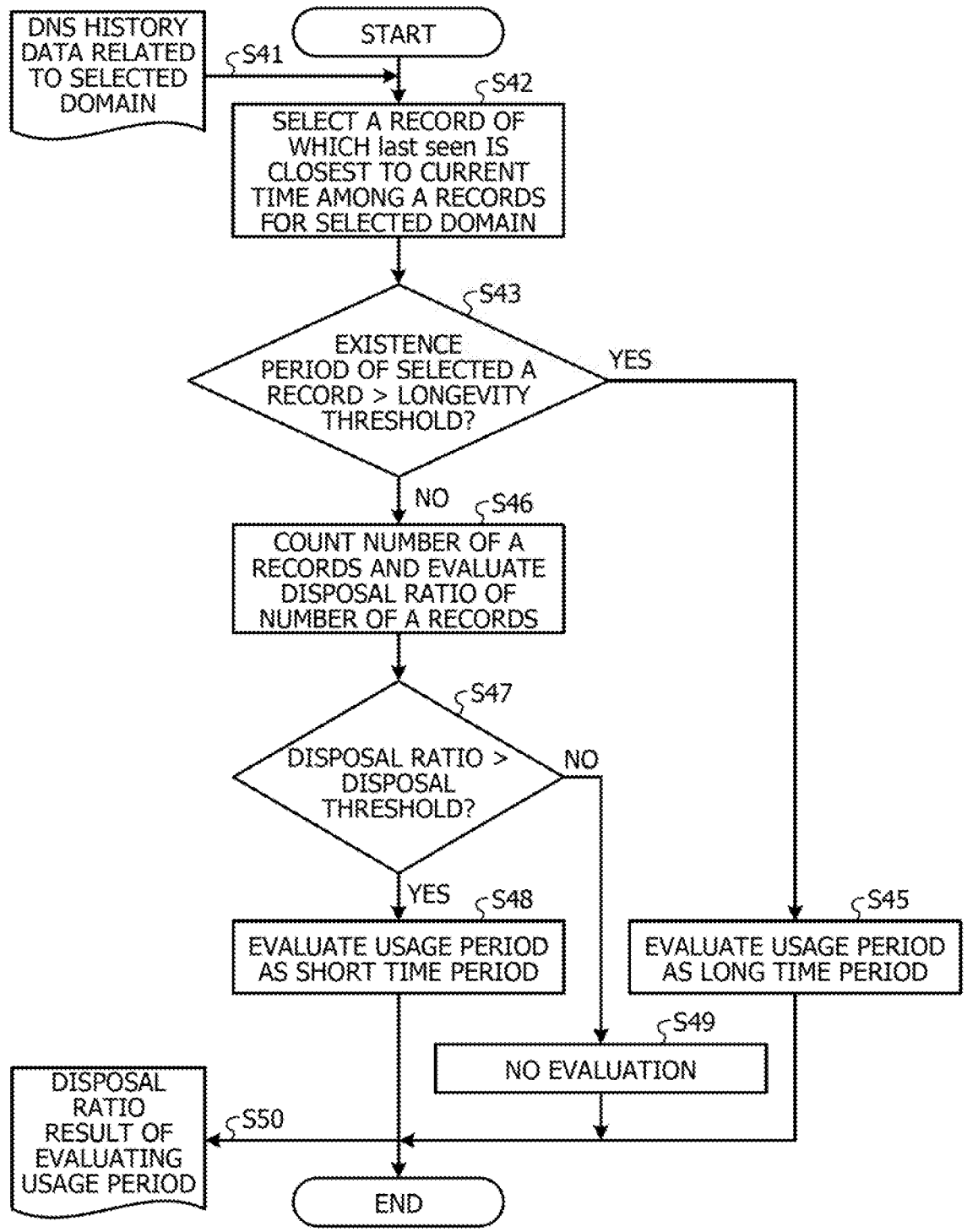
FIG. 9 is a flowchart illustrating an example of a usage period estimation process.

FIG. 9 is a flowchart illustrating an example of the usage period estimation process. As illustrated in FIG. 9, when the usage period estimation process (of S25) is started, the indicator diagnosing section 12 references the history data, related to the selected domain, of the DNS history list 22 (in S41).

Then, the indicator diagnosing section 12 selects an A record of which last seen is the closest to the current time among A records related to the selected domain (in S42). Then, the indicator diagnosing section 12 determines, based on the existence period learning data 24, whether an existence period of the selected A record is longer than a predetermined longevity threshold (in S43). The longevity threshold is set to a value of several months, one year, or the like by machine learning or the like in advance.

When the existence period of the selected A record is longer than the longevity threshold (Yes in S43), the indicator diagnosing section 12 evaluates a usage period of the selected A record as a long time period for which the A record is estimated to be used (in S45).

When the existence period of the selected A record is equal to or shorter than the longevity threshold (No in S43), the indicator diagnosing section 12 counts the number of A records and evaluates a disposal ratio (in S46). An existence period threshold to be used to determine whether the A record is a disposal record is set to a value of 1 day, 1 week, or the like in advance. Then, the indicator diagnosing section 12 evaluates, as the disposal ratio, the ratio of the number of A records evaluated as disposal records based on existence periods of the A records with respect to the number of all A records.

Then, the indicator diagnosing section 12 determines whether the disposal ratio is higher than a disposal threshold set in advance (in S47). When the disposal ratio is higher than the threshold (Yes in S47), the indicator diagnosing section 12 evaluates the usage period of the selected A record as a short time period for which the A record is estimated to be used and that is ended when the use of the A record is terminated (in S48). When the disposal ratio is not higher than the threshold (No in S47), the indicator diagnosing section 12 treats the usage period as no evaluation (in S49). Then, the indicator diagnosing section 12 outputs the disposal ratio and the result of evaluating the usage period in S45, S48, or S49 (in S50) and terminates the process.

Basically, it is assumed that operations of A records for the same domain are roughly the same, it is estimated that when existence periods of the A records are long, future usage periods of the A records are long, and it is estimated that when existence periods of many related A records are short, currently existing indicators indicate that usage periods are short. When those materials do not exist, materials from which the usage period is estimated are not sufficient and the usage period is treated as no evaluation.

FIG. 10 is a diagram describing an example of usage period estimation data. By executing the usage period estimation process, the indicator diagnosing section 12 outputs such usage period estimation data 25 as illustrated in FIG. 10. For example, the usage period estimation data 25 includes, for a selected "domain", a "number of A records", a "disposal ratio", and a "usage period". In the "number of A records", the number of A records counted is stored. In the "disposal ratio", a value of a disposal ratio evaluated is stored. In the "usage period", a value of a usage period evaluated is stored.

Figure 11:
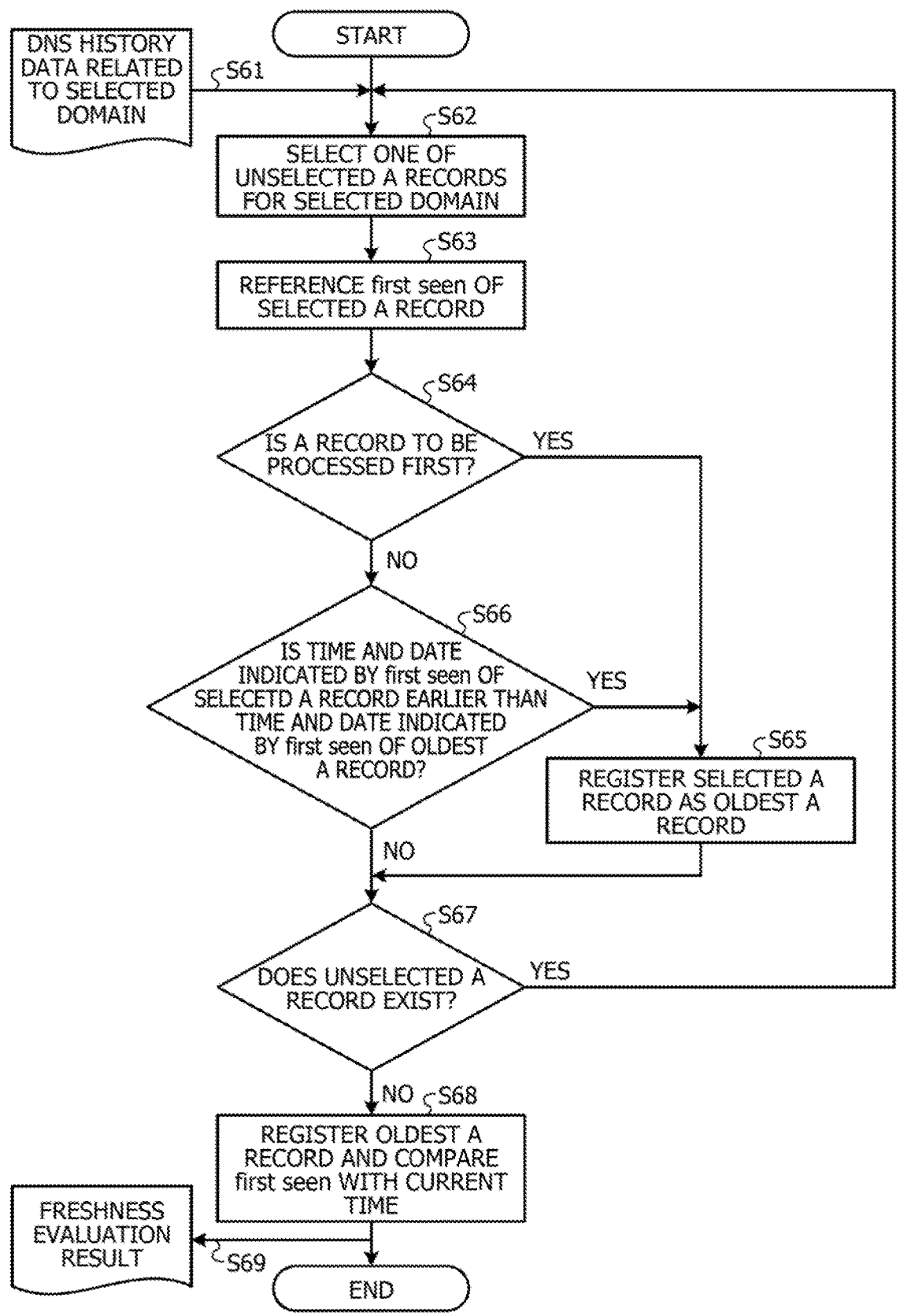
FIG. 11 is a flowchart illustrating an example of a freshness evaluation process.

FIG. 11 is a flowchart illustrating an example of a freshness evaluation process. As illustrated in FIG. 11, when the process is started, the indicator diagnosing section 12 references the history data, related to the selected domain, of the DNS history list 22 (in S61).

Then, the indicator diagnosing section 12 selects one of unselected A records for the selected domain (in S62). Then, the indicator diagnosing section 12 references first seen of the selected A record (in S63).

Then, the indicator diagnosing section 12 determines whether the selected A record is to be processed first (in S64). When the selected A record is to be processed first (Yes in S64), the indicator diagnosing section 12 registers the selected A record as the oldest A record (in S65).

When the selected A record is not to be processed first (No in S64), the indicator diagnosing section 12 determines whether a time and date indicated by the first seen of the selected A record is earlier than a time and date indicated by first seen of the oldest A record (in S66). When the time and date indicated by the first seen of the selected A record is earlier than the time and date indicated by the first seen of the oldest A record (Yes in S66), the indicator diagnosing section 12 registers the selected A record as the oldest A record (in S65).

When the time and date indicated by the first seen of the selected A record is not earlier than the time and date indicated by the first seen of the oldest A record (No in S66), the indicator diagnosing section 12 causes the process to proceed to S67 without registering the selected A record as the oldest A record.

Then, the indicator diagnosing section 12 determines whether an unselected A record exists (in S67). When the unselected A record exists (Yes in S67), the indicator diagnosing section 12 causes the process to return to S62 and continuously executes the processes of S62 to S67 until an unselected A record does not exist. When the unselected A record does not exist (No in S67), the indicator diagnosing section 12 registers the final oldest A record, compares first seen of the oldest A record with the current time, and calculates the difference between the first seen and the current time (in S68).

Then, the indicator diagnosing section 12 outputs an evaluation result based on the time difference calculated in S68 as a freshness evaluation result (in S69) and terminates the process. For example, when the first seen is within a time period set in advance and to be used to determine whether the first seen is evaluated as fresh, the indicator diagnosing section 12 evaluates the first seen as fresh. A user may give, as a parameter, the time period to be used to determine whether the first seen is evaluated as fresh. For example, the time period to be used to determine whether the first seen is evaluated as fresh may be set to 1 week, 1 month, or the like.

When the first seen is not evaluated as fresh, the first seen may be treated as no evaluation.

FIG. 12 is a diagram describing an example of freshness evaluation data. By executing the freshness evaluation process, the indicator diagnosing section 12 outputs such freshness evaluation data 26 as illustrated in FIG. 12. For example, the freshness evaluation data 26 includes, for a selected "domain", an "oldest A record", "first seen", "last seen", and "freshness". In the "oldest A record", the final oldest A record is stored. In "first seen" and "last seen", first seen and last seen of the oldest A record are stored. In the "freshness", an evaluation result indicating a time difference between the first seen and the current time is stored. For example, when the current time is Aug. 7, 2018, a parameter indicating the time period to be used to determine whether first seen is evaluated as fresh is set to 1 week, and the first seen indicates Aug. 1, 2018, the time difference is shorter than 1 week, and thus data indicating fresh is stored.

Return to FIG. 6, after S26, the indicator diagnosing section 12 executes remark determination on the selected domain based on the stored diagnosis results (existence period learning data 24, usage period estimation data 25, and freshness evaluation data 26) (in S27).

Figure 13:
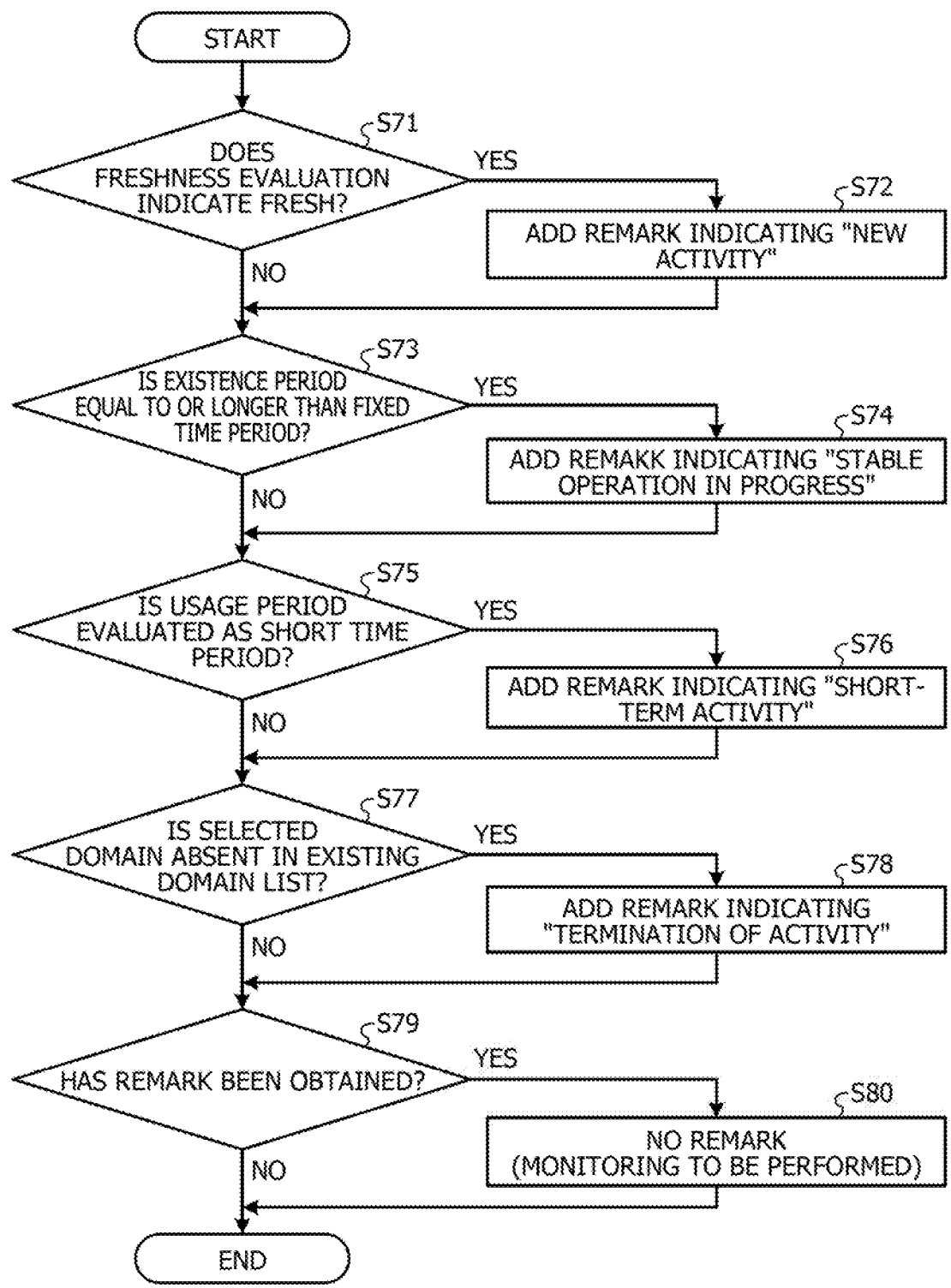
FIG. 13 is a flowchart illustrating an example of a remark determination process.

FIG. 13 is a flowchart illustrating an example of the remark determination process. As illustrated in FIG. 13, when the remark determination process (of S27) is started, the indicator diagnosing section 12 determines, based on the freshness evaluation data 26, whether the freshness evaluation indicates fresh (in S71).

When the freshness evaluation indicates fresh (Yes in S71), the indicator diagnosing section 12 adds a remark indicating a "new activity" (in S72). The "new activity" is a remark indicating that the activity has just started, and promoting a user to pay attention since the activity may become active.

Then, the indicator diagnosing section 12 determines, based on the existence period learning data 24, whether the existence period is equal to or longer than a fixed time period (of, for example, 1 year) (in S73). When the existence period is equal to or longer than the fixed time period (Yes in S73), the indicator diagnosing section 12 adds a remark indicating a "stable operation in progress" (in S74). The remark indicating the "stable operation in progress" informs the user that there is not a large change in an operational status of the domain described in the black list and that the same or similar operation is continued.

Then, the indicator diagnosing section 12 determines, based on the usage period estimation data 25, whether the usage period has been evaluated as the short time period (in S75). When the usage period has been evaluated as the short time period (Yes in S75), the indicator diagnosing section 12 adds a remark indicating a "short-term activity" (in S76). The remark indicating the "short-term activity" alerts the user that the activity of the domain may change within a short time period and that attention is focused on the collection of threat information and an update of the black list.

Then, the indicator diagnosing section 12 determines whether the selected domain is absent in the existing domain list 21 (in S77). When the selected domain is absent in the existing domain list 21 (Yes in S77), the indicator diagnosing section 12 adds a remark indicating the "termination of the activity" (in S78). The remark indicating the "termination of the activity" informs the user that the activity is not currently observed in the DNS and may be restarted but a malicious activity is currently stopped.

Then, the indicator diagnosing section 12 determines whether a remark has not been obtained in the processes of S71 to S78 (in S79). When the remark has not been obtained (Yes in S79), the indicator diagnosing section 12 provides a result indicating "no remark (monitoring to be performed)". Providing the result indicating "no remark (monitoring to be performed)" (in S80) promotes the user to carefully perform monitoring until a clear remark is output.

Return to FIG. 6, after S27, the indicator diagnosing section 12 determines whether an unselected domain exists (in S28). When the unselected domain exists (Yes in S28), the indicator diagnosing section 12 causes the process to return to S22. When the unselected domain does not exist (No in S28), the indicator diagnosing section 12 outputs the result 23 of the diagnosis executed on each of the domains of the indicator list 20 and one or more of the remarks (in S29) and terminates the process.

FIG. 14 is a diagram describing an example of the diagnosis result. As illustrated in FIG. 14, the diagnosis result 23 includes remarks and the details (existence period learning data 24, the usage period estimation data 25, and the freshness evaluation data 26) of the evaluation executed on each of the domains that are included in the indicator list 20 and to be diagnosed. For example, in a "diagnostic target" of the diagnosis result 23, the selected domain is stored. When an A record is returned for the selected domain, a value of the A record is stored in an "activity status" of the diagnosis result 23. In addition, in an "existence period" of the diagnosis result 23, a value of the "existence period" indicated in the existence period learning data 24 (refer to FIG. 8) is stored. In a "usage period" of the diagnosis result 23, a value of the "usage period" indicated in the usage period estimation data 25 (refer to FIG. 10) is stored. In "freshness" of the diagnosis result 23, a value of the "freshness" indicated in the freshness evaluation data 26 is stored. In a "remark" of the diagnosis result 23, the remarks added in the remark determination process are stored. Based on the diagnosis result 23, the user may easily confirm the evaluation details of the domains of the indicator list 20 and the remarks.

As described above, the information processing device 1 includes the DNS monitoring section 10, the DNS history learning section 11, and the indicator diagnosing section 12. The DNS monitoring section 10 provides, based on the domain information included in the input indicator list 20, an inquiry about whether an IP address associated with the domain information exists to the DNS, which manages the associations between the domain information and the IP addresses. The DNS history learning section 11 monitors communication of the DNS and provides an inquiry about an answer history, related to the domain information to Passive DNS, which manages answer histories, related to the associations between the domain information and the IP addresses, of the DNS. The indicator diagnosing section 12 outputs, based on an answer result acquired from the DNS and the answer history acquired from Passive DNS, a result of diagnosing threat content of a cyber attack related to the domain information.

Thus, the information processing device 1 may support the user to evaluate a current status of a malicious domain related to a cyber attack and included in the indicator list 20. For example, the user may easily recognize the current status (indicating, for example, whether the domain is active) based on the answer result from the DNS. In addition, the user may recognize, based on the answer history acquired from Passive DNS, a future usage trend indicating, for example, whether the active IP address is used for only a short time period or over a long time period.

When the IP address associated with the domain information exists in the answer result from the DNS, the indicator diagnosing section 12 outputs a usage period, estimated based on the answer history related to the domain information and acquired from Passive DNS, of the IP address associated with the domain information. Thus, the user may easily recognize the usage period of the existing IP address that is indicated in the answer result from the DNS or is active for the cyber attack.

In addition, the indicator diagnosing section 12 estimates the usage period of the IP address associated with the domain information based on the existence period of the IP address. The existence period of the IP address is based on the answer history, related to the IP address associated with the domain information, of Passive DNS (for example, estimates the usage period as a long time period when the usage period is equal to or longer than a predetermined time period). Thus, the user may easily recognize whether the activity causes the IP address to be used for a long time period, from the existence period of the IP address. The existence period of the IP address is based on the answer history from Passive DNS.

In addition, the indicator diagnosing section 12 estimates the usage period of the IP address associated with the domain information based on a disposal ratio of the number of IP addresses of which existence periods are shorter than the predetermined time period with respect to the number of IP addresses associated with the domain information and counted based on the answer history, related to the domain information, of Passive DNS. For example, when the disposal ratio exceeds a predetermined value, the indicator diagnosing section 12 estimates, as a short time period, the usage period of the IP address associated with the domain information. Thus, the user may easily recognize, based on a past disposal status of the IP address based on an answer history from Passive DNS, whether the activity causes the IP address to be used for a short time period and disposed.

In addition, the indicator diagnosing section 12 outputs freshness of a cyber attack related to the domain information or a validity degree indicating whether the domain information is still valid as an indicator, based on the answer history, related to the IP address associated with the domain information, of Passive DNS and a result of comparing the oldest date included in the answer history with the current date. Based on the freshness of the cyber attack based on the answer history from Passive DNS, the user may easily recognize information related to a fresh and new activity and included in the indicator list 20.

The constituent components of the devices illustrated in the drawings may not be physically configured as illustrated in the drawings. Specific forms of the distribution and integration of the devices are not limited to those illustrated in the drawings, and all or some of the devices may be functionally or physically distributed and integrated in arbitrary units based on various loads, usage statuses, and the like.

All or some of the various processing functions to be executed by the information processing device 1 may be executed by a central processing unit (CPU) (or a microcomputer such as a microprocessor unit (MPU) or a micro controller unit (MCU)). All or arbitrary some of the various processing functions may be executed by a program analyzed and executed by the CPU (or the microcomputer such as the MPU or the MCU) or may be executed by hardware using wired logic. In addition, the various processing functions to be executed by the information processing device 1 may be executed by causing multiple computers to collaborate with each other by cloud computing.

Figure 15:
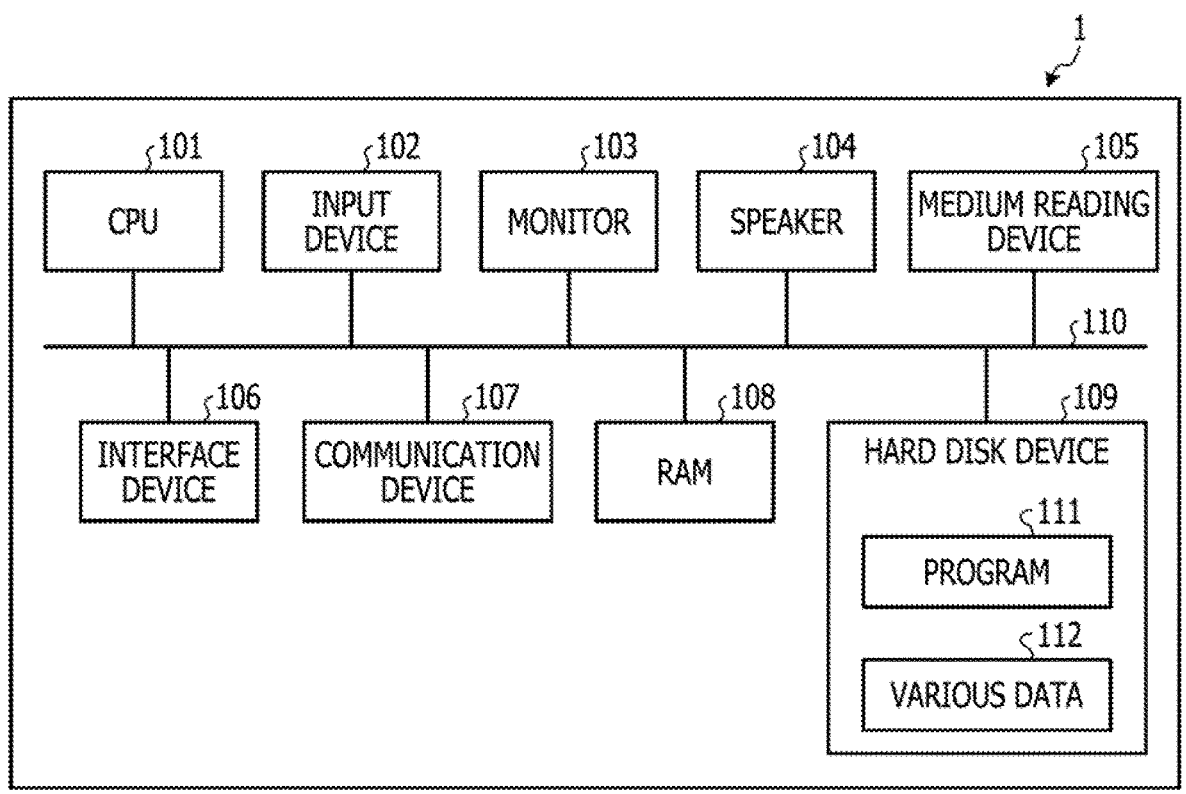
FIG. 15 is a block diagram illustrating an example of a hardware configuration of the information processing device according to the embodiment.

The various processes described in the embodiment may be realized by causing a computer to execute a program prepared in advance. An example of the computer (hardware) that executes the program having the same functions as those described above in the embodiment is described below. FIG. 15 is a block diagram illustrating an example of a hardware configuration of the information processing device 1 according to the embodiment.

As illustrated in FIG. 15, the information processing device 1 includes a CPU 101 for executing various arithmetic processing, an input device 102 for receiving input data, a monitor 103, and a speaker 104. The information processing device 1 also includes a medium reading device 105 for reading a program and the like from a recording medium, an interface device 106 for coupling the information processing device 1 to various devices, and a communication device 107 that communicates with and is coupled to an external device via a cable or wirelessly. The information processing device 1 also includes a RAM 108 for temporarily storing various information and a hard disk device 109. The units (101 to 109) within the information processing device 1 are coupled to a bus 110.

In the hard disk device 109, a program 111 for executing the various processes, which are to be executed by the DNS monitoring section 10, the DNS history learning section 11, the indicator diagnosing section 12, and the like, is stored. The DNS monitoring section 10, the DNS history learning section 11, the indicator diagnosing section 12, and the like are described above in the embodiment. In addition, in the hard disk device 109, various data 112 to be referenced by the program 111 is stored. The input device 102 receives input operation information from an operator, for example. The monitor 103 displays various screens to be operated by the operator, for example. The interface device 106 is coupled to a printing device or the like, for example. The communication device 107 is coupled to a communication network such as a local area network (LAN) and communicates various information with the external device via the communication network.

The CPU 101 reads the program 111 stored in the hard disk device 109, loads the program 111 into the RAM 108, and executes the program 111, thereby executing the various processes related to the DNS monitoring section 10, the DNS history learning section 11, and the indicator diagnosing section 12, and the like. The program 111 may not be stored in the hard disk device 109. For example, the information processing device 1 may read the program 111 stored in a recording medium readable by the information processing device 1 and execute the program 111. The recording medium readable by the information processing device 1 corresponds to a portable recording medium such as a CD-ROM, a DVD, or a Universal Serial Bus (USB) memory, a semiconductor memory such as a flash memory, a hard disk drive, or the like. The program 111 may be stored in a device coupled to a public line, the Internet, a LAN, or the like, and the information processing device 1 may read the program 111 from the public line, the Internet, the LAN, or the like and execute the program 111.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A cyber attack evaluation method comprising:
transmitting, based on first domain information included in cyber attack information, an inquiry about whether a first IP address associated with the first domain information is stored to a first management server configured to store associations between domain information and IP addresses;
transmitting another inquiry about a first answer history related to the first domain information to a second management server configured to store answer histories of the first management server by monitoring communication of the first management server, the answer histories being related to the associations between the domain information and the IP addresses; and
outputting, based on an answer of the inquiry acquired from the first management server and the first answer history acquired from the second management server, a result of diagnosing threat content of a cyber attack related to the first domain information,
wherein the outputting includes outputting a usage period during which the first IP address associated with the first domain information is used for the cyber attack when the answer indicates that the first IP address is stored, and the usage period is determined based on the first answer history,
wherein the outputting includes determining the usage period based on one or more existence periods of one or more IP addresses associated with the first domain information according to the first answer history,
wherein the determining is executed based on a ratio of a number of IP addresses that are included in the one or more IP addresses and of which existence periods are shorter than a threshold with respect to a number of the one or more IP addresses.

2. The cyber attack evaluation method according to claim 1, wherein the outputting includes outputting a validity degree of the cyber attack related to the first domain information based on a result of comparing an oldest date included in the first answer history with a current date.

3. A cyber attack evaluation device comprising:
a memory; and
a processor coupled to the memory and the processor configured to:
transmit, based on first domain information included in cyber attack information, an inquiry about whether a first IP address associated with the first domain information is stored to a first management server configured to store associations between domain information and IP addresses,
transmit another inquiry about a first answer history related to the first domain information to a second management server configured to store answer histories of the first management server by monitoring communication of the first management server, the answer histories being related to the associations between the domain information and the IP addresses, and
perform, based on an answer of the inquiry acquired from the first management server and the first answer history acquired from the second management server, output of a result of diagnosing threat content of a cyber attack related to the first domain information,
wherein the output includes outputting a usage period during which the first IP address associated with the first domain information is used for the cyber attack when the answer indicates that the first IP address is stored, and the usage period is determined based on the first answer history,
wherein the output includes determining the usage period based on one or more existence periods of one or more IP addresses associated with the first domain information according to the first answer history,
wherein the determining is executed based on a ratio of a number of IP addresses that are included in the one or more IP addresses and of which existence periods are shorter than a threshold with respect to a number of the one or more IP addresses.

4. The cyber attack evaluation device according to claim 3, wherein the output includes outputting a validity degree of the cyber attack related to the first domain information based on a result of comparing an oldest date included in the first answer history with a current date.

5. A non-transitory computer-readable medium storing instructions executable by one or more computers, the instructions comprising:
one or more instructions for transmitting, based on first domain information included in cyber attack information, an inquiry about whether a first IP address associated with the first domain information is stored to a first management server configured to store associations between domain information and IP addresses;
one or more instructions for transmitting another inquiry about a first answer history related to the first domain information to a second management server configured to store answer histories of the first management server by monitoring communication of the first management server, the answer histories being related to the associations between the domain information and the IP addresses; and
one or more instructions for outputting, based on an answer of the inquiry acquired from the first management server and the first answer history acquired from the second management server, a result of diagnosing threat content of a cyber attack related to the first domain information,
wherein the outputting includes outputting a usage period during which the first IP address associated with the first domain information is used for the cyber attack when the answer indicates that the first IP address is stored, and the usage period is determined based on the first answer history,
wherein the outputting includes determining the usage period based on one or more existence periods of one or more IP addresses associated with the first domain information according to the first answer history,
wherein the determining is executed based on a ratio of a number of IP addresses that are included in the one or more IP addresses and of which existence periods are shorter than a threshold with respect to a number of the one or more IP addresses.

* * * * *